No. 833,171. PATENTED OCT. 16, 1906.
M. VON MÜNSTER.
POCKET CUTLERY.
APPLICATION FILED OCT. 4, 1905.
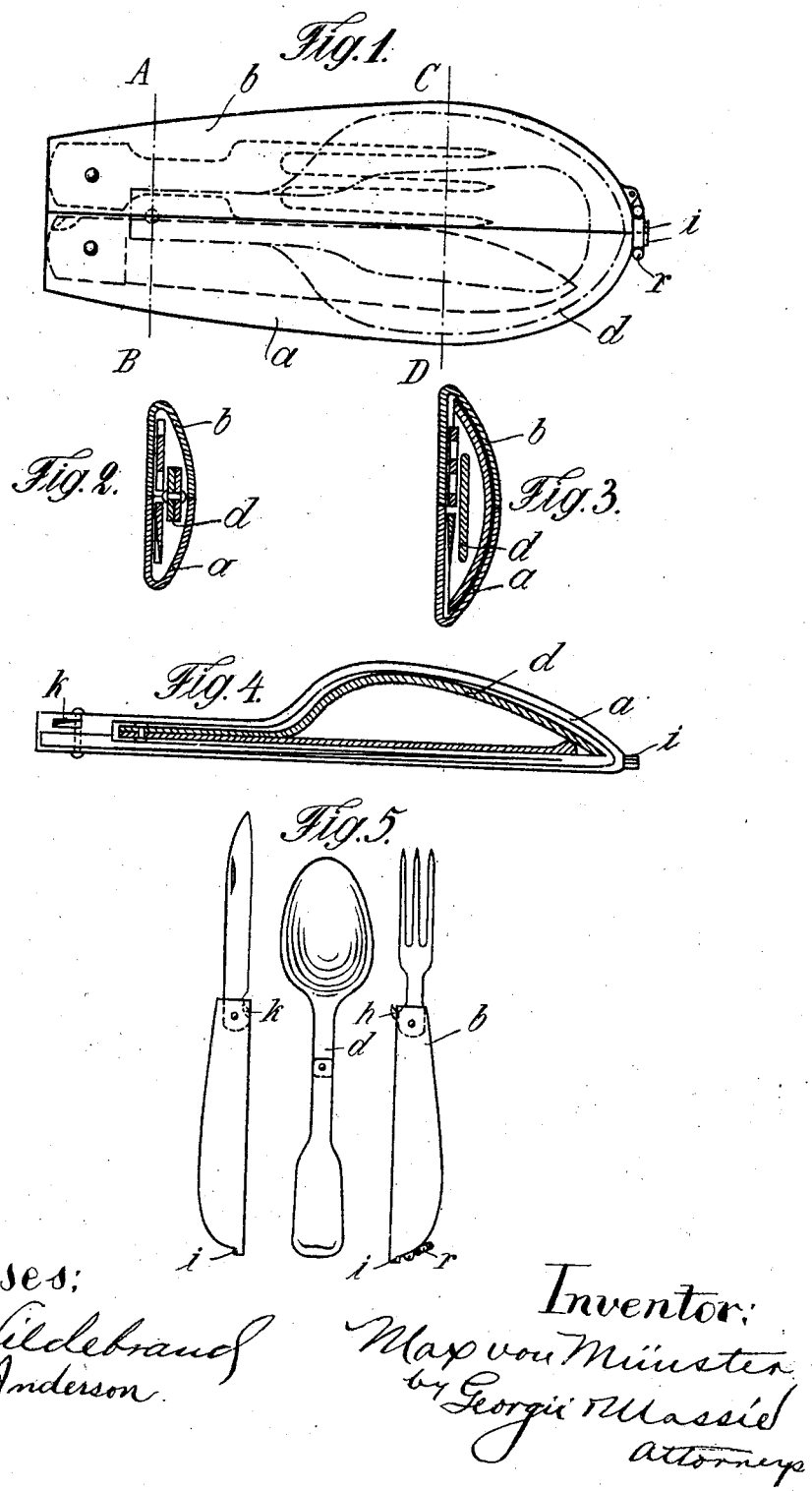

UNITED STATES PATENT OFFICE.

MAX VON MÜNSTER, OF MUNICH, GERMANY.

POCKET-CUTLERY.

No. 833,171.   Specification of Letters Patent.   Patented Oct. 16, 1906.

Application filed October 4, 1905. Serial No. 281,330.

*To all whom it may concern:*

Be it known that I, MAX VON MÜNSTER, a citizen of Germany, residing at Munich, Bavaria, Germany, have invented certain new and useful Improvements in Pocket-Cutlery; and I do hereby declare the following to be a full, clear, and exact description of the invention, such as will enable others skilled in the art to which it appertains to make and use the same.

This invention relates to a pocket-cutlery set consisting of knife, fork, and spoon which is mainly characterized by the handles of the knife and fork being formed as a case in two parts mutually complementing one another, which not only completely incloses the knife-blade and the fork, but the spoon also, in such a way that the parts of the cutlery used for eating are entirely prevented from being soiled and damaged and also the clothing (pockets) and the like of the person carrying the case are entirely saved from being soiled or damaged.

This improved pocket-cutlery set is shown in the accompanying drawings, Figure 1 being a view of it folded up; Figs. 2 and 3, cross-sections on the lines A B and C D, respectively, of Fig. 1; Fig. 4, a longitudinal section through the center, while Fig. 5 is an elevation of the set divided into its separate parts ready for use.

As evident from the drawings, the handles *a* and *b* of the knife and fork, which are domed to provide a hollow space for the spoon *d*, form the case in such a way that after they have been folded together and the folding spoon *d* has been inserted between them they are connected along the open side by suitable means in such a way that all the parts of the cutlery are inclosed in them.

In the form of construction shown the connection of the two handles *a* and *b* is made, for instance, by a projecting hook *h* of the handle *b* engaging in a corresponding or suitable aperture on the handle *a*, and, on the other hand, the two opposite ends of the handle are held together by a folding ring *r*, which is placed over the protruding projection *i*.

I declare that what I claim is—

1. A pocket-cutlery set comprising two hollow members open each along one side, a knife secured to one end of one member and receivable therein, a fork secured to one end of the other member and receivable therein, a hinge connection between the two members at one end, and a clip for securing the two members together at the opposite end with the open sides in opposition.

2. A pocket-cutlery set comprising two hollow members open each along one side, a knife pivoted to one end of one member and foldable therein, a fork pivoted to one end of the other member and foldable therein, a separable hinged connection between the two members at one end, and a clip for securing the two members together at the opposite end with the open sides in opposition.

3. A pocket-cutlery set comprising two domed hollow members open each along one side, a knife secured to one end of one member and receivable therein, a fork secured to one end of the other member and receivable therein, a separable hinged connection between the two members at one end, a clip for securing the two members together at the opposite end with the open sides in opposition, and a third member comprising a spoon receivable within the case formed by the two joined members.

4. A pocket-cutlery set comprising two domed hollow members open each along one side, a knife pivoted to one end of one member and foldable therein, a fork pivoted to one end of the other member and foldable therein, a separable hinged connection between the two members at one end, a clip for securing the two members together at the opposite end with the open sides in opposition, and a third member comprising a spoon receivable within the domed case formed by the two joined members.

5. A pocket-cutlery set comprising two domed hollow members open each along one side, a knife pivoted at one end of one member and foldable therein, a fork pivoted at one end of the other member and foldable therein, a hook secured to one end of one member and adapted to engage a recess in one end of the other member to form a separable hinged connection between the two, a folding ring secured to the other end of one member and adapted to engage a stud carried by the corresponding end of the other member to form a clip securing the two members together with the open sides in opposition, and a third member comprising a folding spoon receivable within the domed case formed by the two joined members.

In testimony whereof I hereunto affix my signature in the presence of two witnesses.

MAX VON MÜNSTER.

Witnesses:
 ULYSSES J. BYWATER,
 GEORG KARNER.